Figure 1:
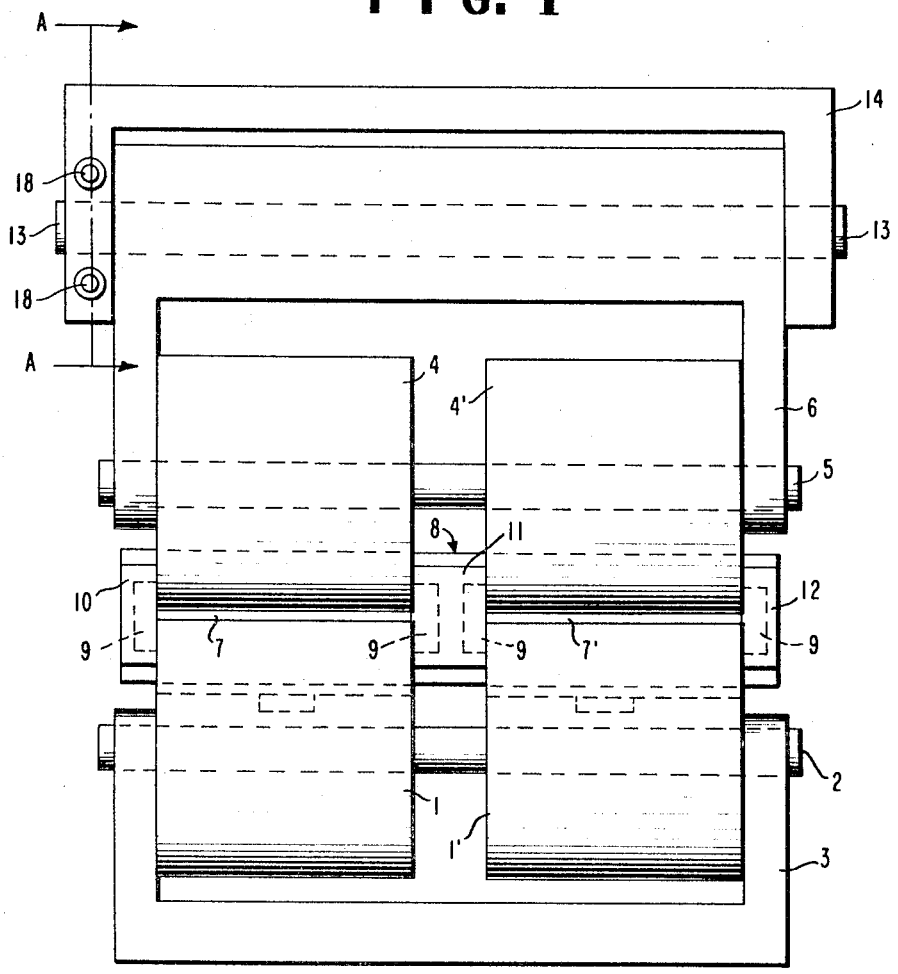
Figure 2:
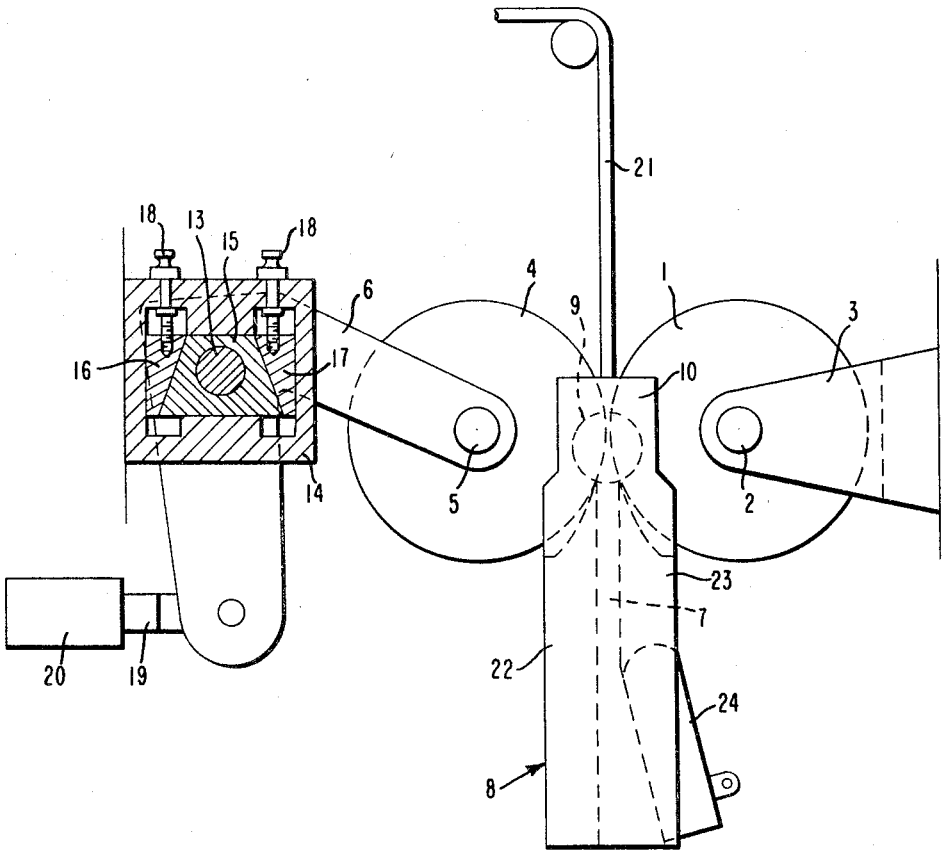

T861032

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 15, 1969

861 O.G. 705

753,132

APPARATUS AND PROCESS FOR SIMULTANEOUS CRIMPING OF TWO TOWS

Robert J. Peters, Waynesboro, Va., assignor to E. I. du Pont de Nemours and Company, Wilmington, Del., a corporation of Delaware

Filed Aug. 16, 1968. Published Apr. 15, 1969
Int. Cl. D02g *1/00*
U.S. Class 28—1
2 Sheets Drawing. 7 Pages Specification

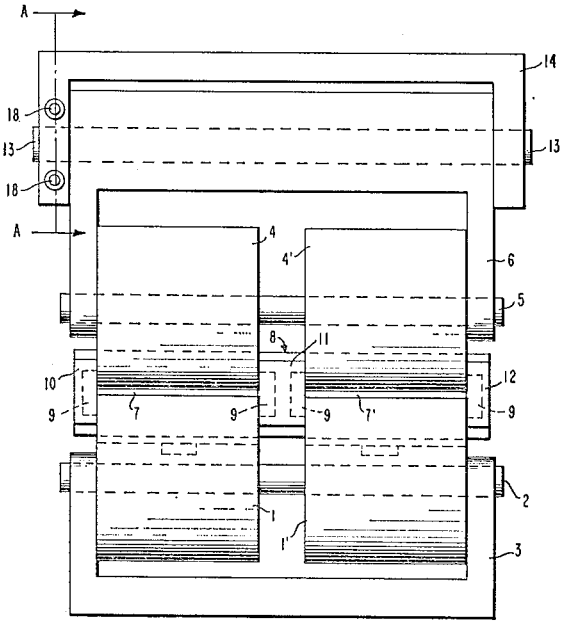

An improved crimping apparatus and process is disclosed which allows for the simultaneous crimping of two tows of filamentary material. The tows are passed (preferably in a side-by-side relationship while they are spaced apart by a distance less than their width) to an adjacent crimper chamber through pairs of feed nip rolls formed by two front rolls mounted on a common shaft and two back rolls on a common shaft. At least one of the common shafts is connected to driving means to drive the feed nip rolls. Means are disclosed for adjusting the parallelism between the shafts. These feed nip roll pairs are adjusted, based upon the observed type (e.g., "mash" or "herringbone") of the crimp imparted to the tow, to apply an essentially constant pressure upon each of the tows as they are advanced to separate crimping chambers; the desired type crimp is thereby simultaneously and uniformly imparted to each tow.

SN - 753132 T861032

April 15, 1969 R. J. PETERS DEF. PUB.

APPARATUS AND PROCESS FOR SIMULTANEOUS CRIMPING OF TWO TOWS

Filed Aug. 16, 1968 Sheet 1 of 2

INVENTOR
ROBERT J. PETERS

BY Eugene Berman
AGENT

SN - 753132 T861032

April 15, 1969 R. J. PETERS DEF. PUB.

APPARATUS AND PROCESS FOR SIMULTANEOUS CRIMPING OF TWO TOWS

Filed Aug. 16, 1968 Sheet 2 of 2

INVENTOR
ROBERT J. PETERS

BY Eugene Berman
AGENT